Patented June 21, 1938

2,121,320

UNITED STATES PATENT OFFICE 2,121,320

QUINOPHTHALONEMONOSULPHONIC ACIDS AND PROCESS OF PREPARING THEM

Georg Kränzlein, Frankfort-on-the-Main, Hans Schlichenmaier, Kelkheim-in-Taunus, and Ludwig Schörnig, Frankfort-on-the-Main, Germany, assignors to General Aniline Works, Inc., New York, N. Y., a corporation of Delaware No Drawing. Application August 2, 1935, Serial No. 34,474. In Germany August 9, 1934

6 Claims.  (Cl. 260—38)

The present invention relates to quinophthalonemonosulphonic acids and to a process of preparing them.

We have found that quinophthalonemonosulphonic acids of the following general formula:

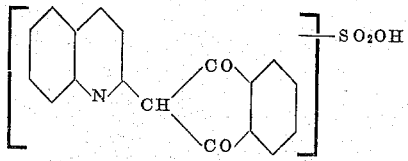

are obtainable by heating at a raised temperature, for instance, above about 100° C. to about 200° C., and if necessary under reduced pressure, the sulphates of quinophthalones or the sulphur trioxide addition products of quinophthalones. The quinophthalonemonosulphonic acids, which are thus easily obtained in a very good yield and of high purity, are distinguished by good tinctorial properties, when compared with the known quinophthalonesulphonic acids which are mixtures of mono- and disulphonic acids. The position of the sulpho group in the molecule is not known.

The process is advantageously carried out by first preparing the sulphate of a quinophthalone, or the sulphur trioxide addition compound of a quinophthalone, and heating it, if necessary under reduced pressure, to a raised temperature. The sulphate is easily obtained in the form of a red crystalline mass by bringing together, for instance, 1 molecular proportion of quinophthalone and 1 molecular proportion of sulphuric acid monohydrate. The addition product is preferably prepared by conducting a current of air charged with sulphur trioxide vapour over the quinophthalone in question contained in a vessel provided with a stirring or kneading device. This process is interrupted when the necessary amount of sulphuric anhydride has been consumed. The preparation of the sulphate and of the sulphur trioxide addition product may, however, like the following heating process necessary for the transformation, be carried out in the presence of a solvent or a diluent, for instance, of tetrachlorethane or trichlorbenzene.

The rapidity of the formation of the quinophthalonemonosulphonic acids from the sulphates or from the sulphur trioxide addition products depends upon the temperature. In order that the transformation of the quinophthalone sulphate may occur smoothly it is essential to remove rapidly and completely from the mass the water formed during the transformation. This is most advantageously attained by operating under a reduced pressure.

The following examples illustrate the invention, but they are not intended to limit it thereto, the parts being by weight:—

1. 27.2 parts of quinophthalone are triturated with 15 parts of sulphuric acid monohydrate. The temperature spontaneously rises a little and the sulphate of quinophthalone is formed which quickly solidifies to a red crystalline mass. It is heated at 190° C. for 4 hours under a pressure of 2–3 mm. of mercury. The melt which is at first rather a thin liquid and bubbly, becomes more and more viscous. After cooling, the solidified mass is powdered and then boiled with hot water wherein it is dissolved. The hot solution is clarified by filtration. The filtrate is salted out with sodium chloride, whereby the quinophthalonemonosulphonic acid is obtained in a good yield. It forms a light yellow powder soluble in water, which dyes wool from an acid bath level yellow tints.

2. 30 parts of 3-hydroxyquinophthalone are triturated with 10 parts of sulphuric acid monohydrate; a slight evolution of heating occurs. The sulphate of 3-hydroxyquinophthalone is obtained, which soon solidifies to a red crystalline mass. It is heated to 190° C. under a pressure of 2–3 mm. of mercury for 7–8 hours whereby the water formed escapes, while forming blisters. When the melt is allowed to cool it solidifies; it is boiled with water and filtered in a hot condition in order to eliminate a small quantity of undissolved parent material. From the hot filtrate part of the 3-hydroxyquinophthalonemonosulphonic acid precipitates on cooling. The filtrate is salted out with sodium chloride so as to precipitate completely the 3-hydroxyquinophthalonemonosulphonic acid. The latter is filtered by suction and washed with a solution of sodium chloride. When dry, it is a yellow powder which dyes wool from an acid bath level yellow shades of very good fastness to light. The yield is very good.

Instead of 10 parts of sulphuric acid monohydrate there may also be used with the same good success 10 parts of fuming sulphuric acid containing 20 per cent. of $SO_3$.

3. 37 parts of sulphur trioxide are slowly introduced by a current of air into 120 parts of 3-hydroxyquinophthalone contained in a kneading apparatus. The sulphuric anhydride is absorbed by the 3-hydroxyquinophthalone. The addition product is a yellow powder. It is heated at 170° C. for 13 hours under a pressure of 2–3 mm.

of mercury. A viscous melt is formed which solidifies in the cold. The product is powdered and then boiled with water, wherein it dissolves almost completely. The insoluble by-products are eliminated by filtration; the 3-hydroxyquinophthalonemonosulphonic acid is salted out, filtered by suction, washed with a sodium chloride solution and dried. The sulphonation product is a yellow powder which dyes wool from an acid bath even tints. The yield is very good.

4. 37 parts of sulphur trioxide are introduced into 120 parts of 3-hydroxyquinophthalone contained in a kneading apparatus as described in Example 3 and the addition product obtained is heated at 170° C. for 13 hours under a pressure of about 760 mm. of mercury.

The solid mass is powdered after cooling and worked up as described in the preceding examples. The mono-sulphonic acid of 3-hydroxyquinophthalone is obtained in a very good yield.

5. 1000 parts of tetrachlorethane are heated together with 50 parts of 3-hydroxyquinophthalone to about 85° C., while stirring, and 30 parts of sulphuric acid monohydrate are slowly added drop by drop. The whole is then heated to boiling and the tetrachlorethane is slowly distilled from the mass during about 12-15 hours. The residue of tetrachlorethane is distilled with steam, the 3-hydroxyquinophthalonemonosulphonic acid being simultaneously dissolved in the water of condensation formed. A small quantity of unsulphonated parent material is eliminated by filtration and the 3-hydroxyquinophthalonemonosulphonic acid is precipitated from the filtrate by means of sodium chloride. The precipitate is filtered by suction, washed with a sodium chloride solution and dried; then it forms a yellow powder. The yield is good.

We claim:

1. The process which comprises heating at a temperature above about 100° C. a compound of the group consisting of sulphates of quinophthalones and SO₃-addition products of quinophthalones.

2. The process which comprises heating at a temperature of about 170 to about 190° C. for several hours a compound of the group consisting of sulphates of quinophthalones and SO₃-addition products of quinophthalones and removing the reaction water formed.

3. The process which comprises heating at a temperature of about 190° C. for about four hours under a reduced pressure of 2 to 3 mm. Hg quinophthalone sulphate.

4. The process which comprises heating at a temperature of about 190° C. for about 7-8 hours under a reduced pressure of 2 to 3 mm. Hg 3-hydroxyquinophthalone sulphate.

5. The process which comprises heating at a temperature of about 170° C. for about 13 hours the SO₃-addition product of 3-hydroxyquinophthalone and removing the reaction water formed.

6. The compound obtained by the process which comprises heating at a temperature of about 170° C. for about 13 hours the SO₃-addition product of 3-hydroxyquinophthalone and removing the reaction water formed.

GEORG KRÄNZLEIN.
HANS SCHLICHENMAIER.
LUDWIG SCHÖRNIG.